Patented June 15, 1954

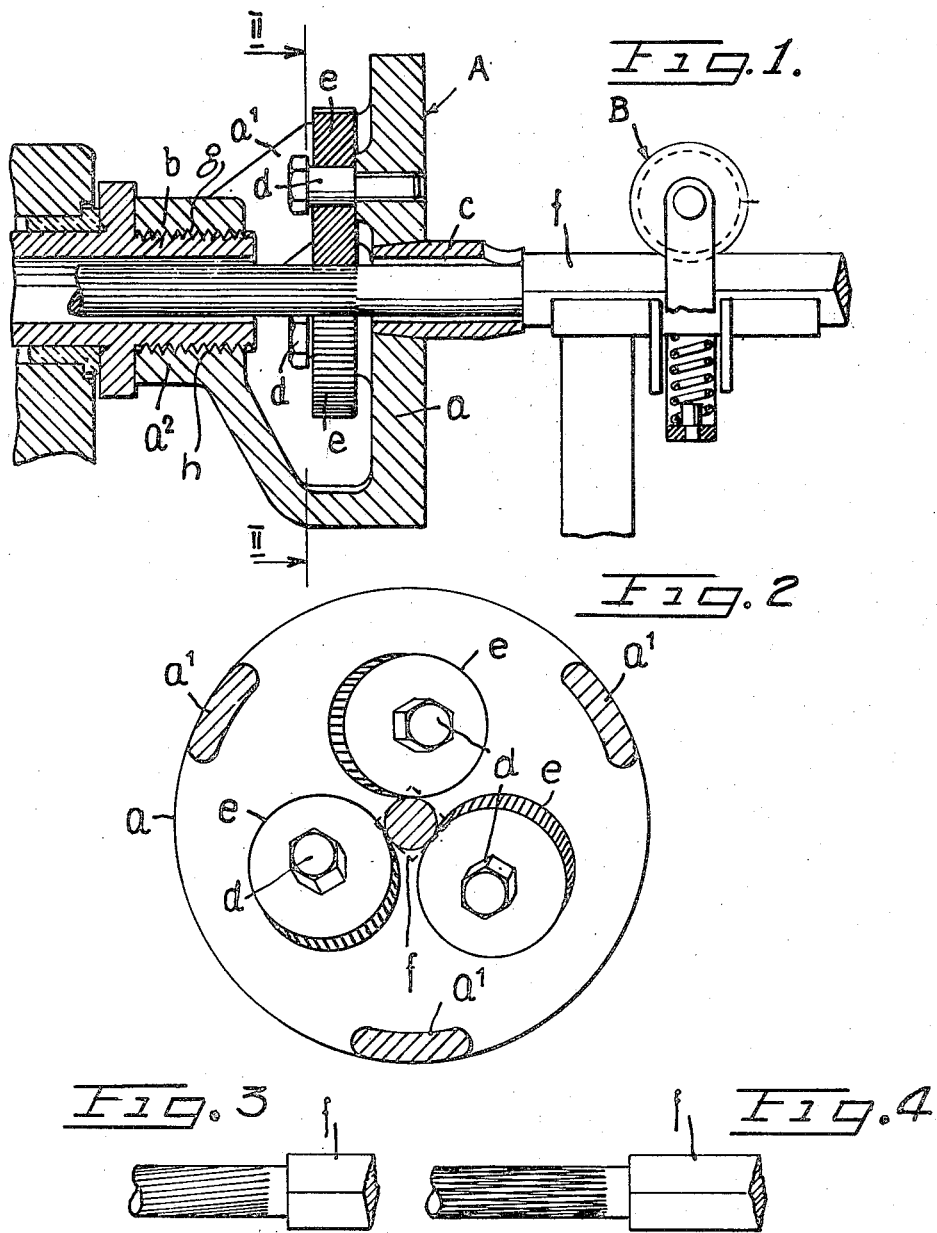

2,681,086

UNITED STATES PATENT OFFICE 2,681,086

DEVICE FOR THE MANUFACTURE OF ROUND CORRUGATED WOODEN RODS

Hugo Degen, Binningen, near Basel, Switzerland, assignor to Hans Heid, Riehen, near Basel, Switzerland Application November 26, 1951, Serial No. 258,154

Claims priority, application Switzerland October 15, 1951

4 Claims. (Cl. 144—3)

My invention has for its object a device for the manufacture of round corrugated wooden rods as intended for the execution of wooden dowels for furniture and the like.

My improved device is characterized by a carrier adapted to be mounted on a hollow rotary spindle and constituted by a disc carrying in its turn on its surface opposed to the end through which said carrier is secured a hollow cylindrical cutter extending along the axis of rotation of the carrier while said carrier is provided, on its opposite side with knurling wheels which are mounted loosely over supporting pivots; the whole arrangement is designed in a manner such that when a wooden rod is introduced into the rotary carrier mounted on the hollow spindle driving it, said rod is first submitted to the action of the cylindrical cutter that transforms it into a round rod of the desired diameter after which it is knurled through the knurling wheels. If required, the pivots carrying the knurling cutters may be arranged obliquely with reference to the carrier axis in a manner such that the rods are submitted to an automatic feeding movement due to the action of the knurling cutters. The corrugations thus obtained on the round rod assume a helical shape. The corrugated wooden rods or dowels are thereafter cut into sections having the desired length.

I have illustrated by way of example in accompanying drawings various embodiments of the device forming the object of my invention. In said drawings:

Fig. 1 is an axial cross-section of an arrangement according to my invention.

Fig. 2 is a view partly in section and partly in perspective taken at line II—II of Fig. 1.

Figs. 3 and 4 illustrate two wooden rods provided with different types of corrugations.

The device illustrated in Figs. 1 and 2 includes a carrier member A constituted by a carrier disc $a$ and a carrier sleeve or tubular member $a2$ adapted to be threaded at $g$ and $h$ over a hollow rotary carrier spindle $b$, the parts $a$ and $a2$ being connected in axial relationship by means of three arms $a1$ which arms are disposed at 120° from one another. The hollow rotary spindle $b$ on which the carrier member A is thus mounted is rotatably driven by means of a suitable machine-tool.

The surface of the carrier disc $a$ that is furthest removed from the threaded member $a2$ is provided with a central aperture and this part of the carrier disc $a$ carries in its central aperture a hollow cylindrical cutter $c$. On the opposite surface of the carrier disc $a$ are mounted knurling wheels or cylindrical knurling cutters rotatably carried by corresponding pivots $d$, the number of pivots and tools $d$ and $e$ being equal to three for instance. Now, if a square wooden rod $f$ is introduced into the device under the control of a guiding apparatus illustrated diagrammatically at B and which is not described in further detail in the present specification as it forms no part of the invention, said rod engaging the rotary carrier A is cut by the cylindrical cutter $c$ into a round shape of a suitable diameter, after which the rod is corrugated through the knurling wheels $e$, as readily apparent from inspection of Fig. 1. The round rod to be corrugated is finally cut into sections with a view to obtaining corrugated wooden dowels of the type used in the construction of furniture, said dowels cut in the shape of elements of the desired length.

In Fig. 1 the pivots carrying the knurling cutters $e$ are arranged in parallelism with the axis of rotation of the carrier A; there is obtained in this case a round wooden rod which is corrugated in a direction parallel with the axis of rotation. The pivots carrying the tools may however, in accordance with the modification illustrated in Fig. 2, be mounted obliquely with reference to the carrier disc so as to produce a round rod with helical corrugations as illustrated in Fig. 3. This oblique arrangement of the knurling wheels $e$ tends to impart a feeding movement to the wooden piece which is machined.. Further if one of the three knurling wheels which carry the corrugations is positioned to assume an opposed oblique direction with respect to the direction of the corrugations on the remaining two wheels, it is possible to obtain a rod having a cross corrugated surface and which rod is adapted to be cut into sections. The corrugations of this latter modification assume the crossed shape as illustrated in Fig. 4.

What I claim is:

1. A device for the manufacture of round corrugated wooden rods comprising a rotatable carrier member in axial alignment with and connected to a hollow rotary carrier spindle, said carrier member including on one side thereof a disc having an axial opening and a sleeve axially disposed to and removably engageable on said hollow rotary spindle, peripheral parts on said spindle connecting said sleeve to said disc, the axial opening of said disc being in alignment with the axis of said sleeve, a hollow cylindrical cutter fitted inside said axial opening in said disc, said cutter having an operative portion projecting beyond the surface of said disc which is removed from said sleeve, the axis of said cutter coinciding with the axis of said disc opening and a plurality of knurling wheels rotatably mounted at equal distances from the center of said disc and on the face of said disc which is opposite the face of the disc to which said sleeve is connected, the axes of the knurling wheels being inclined with respect to each other and with respect to the axis of said carrier plate whereby the knurling of the rod by the knurling wheel imparts a feeding movement to said rod.

2. A device for the manufacture of round corrugated wooden rods comprising a rotatable carrier member in axial alignment with and connected to a hollow rotary spindle, said carrier member including on one side thereof a sleeve axially disposed and removably engageable with said spindle and a disc having an axial opening in alignment with the axis of said sleeve, and on the other side of said carrier member a hollow cylindrical cutter which is fitted inside and in axial alignment with said axial opening in said disc, said cutter having an operative portion projecting beyond the surface of said disc opposite the disc surface to which the sleeve is attached, peripheral connecting means on said spindle connecting said sleeve to said disc and a plurality of rotatable knurling wheels pivotally mounted at equal distances from the center of said disc on the face of said disc opposite the face to which said sleeve is connected, the axes of the knurling wheels being obliquely inclined with respect to each other and with respect to the axis of said carrier plate whereby the corrugating operation of said wheels imparts a feeding movement to said rod.

3. A device as in claim 2 wherein said knurling wheels are each provided with peripheral cutting striations parallel with the axis of said wheel.

4. A device as in claim 2 wherein said knurling wheels are each provided with oblique cutting edges relative to the axis of said wheel.

References Cited in the file of this patent

UNITED STATES PATENTS

| Number | Name | Date |
|---|---|---|
| 430,144 | Palmer | June 17, 1890 |
| 1,223,597 | Merry et al. | Apr. 24, 1917 |
| 1,427,073 | Davis | Aug. 22, 1922 |
| 1,981,183 | Margelis | Nov. 20, 1934 |
| 2,529,018 | Hancharik | Nov. 7, 1950 |